(12) United States Patent
Engelen (10) Patent No.: US 11,668,336 B2
(45) Date of Patent: *Jun. 6, 2023

(54) ADAPTOR FOR ATTACHING A PRIME MOVER TO AN ACTUATOR (71) Applicant: Michael Engelen, Cologne, MN (US)

(72) Inventor: Michael Engelen, Cologne, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/562,407

(22) Filed: Dec. 27, 2021

(65) Prior Publication Data
US 2022/0196055 A1 Jun. 23, 2022

Related U.S. Application Data (63) Continuation of application No. 17/217,500, filed on Mar. 30, 2021, now Pat. No. 11,209,035, which is a continuation of application No. 16/886,312, filed on May 28, 2020, now abandoned, which is a continuation of application No. 15/914,546, filed on
(Continued)

(51) Int. Cl.
F16B 17/00 (2006.01)
F04B 53/22 (2006.01)
F15B 21/00 (2006.01)
F04B 17/05 (2006.01)
B66D 3/20 (2006.01)
B66D 3/26 (2006.01)
(Continued)

(52) U.S. Cl.
CPC ............... *F16B 17/00* (2013.01); *B66D 3/20* (2013.01); *B66D 3/26* (2013.01); *F04B 17/05* (2013.01); *F04B 53/22* (2013.01); *F15B 21/003* (2013.01); *F15B 2211/2053* (2013.01); *F15B 2211/20523* (2013.01); *F16B 35/005* (2013.01); *F16H 57/025* (2013.01)

(58) Field of Classification Search
CPC ........ F16B 17/00; F15B 21/003; F04B 39/14; F04B 53/22
See application file for complete search history.

(56) References Cited

U.S. PATENT DOCUMENTS 5,823,752 A * 10/1998 Hoenisch ............... F04B 1/145
417/363
6,036,452 A 3/2000 Huang
(Continued)

OTHER PUBLICATIONS

Prosecution history from U.S. Appl. No. 14/873,674, filed Oct. 2, 2015 including: Notice of Allowance and Fees Due dated Nov. 29, 2017.
(Continued)

*Primary Examiner* — Michael Leslie
(74) *Attorney, Agent, or Firm* — Peter J. Ims; Westman, Champlin & Koehler, P.A.

(57) ABSTRACT

An adaptor is used to couple a prime mover to an actuator. The adaptor includes a first portion that attaches to the prime mover and a second portion that attaches to the actuator. The outer surface of the first portion is defined by at least one flat portion connected by at least one arcuate portion. The second portion has a bore configured to accept the first portion, with an inner surface shaped to complement the outer surface of the first portion. A bore through the first portion accepts a drive shaft of the prime mover therethrough where the drive shaft is configured to engage the actuator.

15 Claims, 10 Drawing Sheets

Related U.S. Application Data

Mar. 7, 2018, now Pat. No. 10,670,066, which is a continuation of application No. 14/873,674, filed on Oct. 2, 2015, now Pat. No. 9,926,961.

(60) Provisional application No. 62/058,778, filed on Oct. 2, 2014.

(51) Int. Cl.
*F16H 57/025* (2012.01)
*F16B 35/00* (2006.01)

(56) References Cited

U.S. PATENT DOCUMENTS

| | | | |
|---|---|---|---|
| 6,764,284 | B2 | 7/2004 | Oehman, Jr. |
| 7,780,406 | B2 | 8/2010 | Sloan et al. |
| 9,926,961 | B1 | 3/2018 | Engelen |
| 10,670,066 | B2 | 6/2020 | Engelen |
| 11,209,035 | B2 | 12/2021 | Engelen |
| 2020/0291977 | A1 | 9/2020 | Engelen |

OTHER PUBLICATIONS

Prosecution history from U.S. Appl. No. 15/914,546, filed Mar. 7, 2018 including: Notice of Allowance and Fees Due dated Jan. 29, 2020; Advisory Action dated Dec. 4, 2019; Final Rejection dated Sep. 24, 2019; and Non-Final Rejection dated Jun. 17, 2019.
Prosecution history from U.S. Appl. No. 16/886,312, filed May 28, 2020 including: Non-Final Office Action dated Dec. 30, 2020.
Prosecution history from U.S. Appl. No. 17/217,500, filed Mar. 30, 2021 including: Notice of Allowance and Fees Due dated Aug. 27, 2021.

\* cited by examiner

ADAPTOR FOR ATTACHING A PRIME MOVER TO AN ACTUATOR

CROSS REFERENCE TO RELATED APPLICATIONS

The present application is a continuation of U.S. patent application Ser. No. 17/217,500, filed Mar. 30, 2021; which is a continuation of U.S. patent application Ser. No. 16/886,312, filed May 28, 2020; which is a continuation of U.S. patent application Ser. No. 15/914,546, filed on Mar. 7, 2018, entitled, ADAPTOR FOR ATTACHING A PRIME MOVER TO AN ACTUATOR, Patented as U.S. Pat. No. 10,670,066 on Jun. 2, 2020; which is a continuation of U.S. patent application Ser. No. 14/873,674, filed on Oct. 2, 2015, entitled ADAPTOR FOR ATTACHING A PRIME MOVER TO AN ACTUATOR, Patented as U.S. Pat. No. 9,926,961 on Mar. 27, 2018 which claims the benefit of U.S. Provisional Patent Application Ser. No. 62/058,778 entitled ADAPTOR FOR ATTACHING A PROPANE ENGINE TO A HYDRAULIC PUMP that was filed on Oct. 2, 2014, the contents of which are incorporated by reference in their entirety.

BACKGROUND

The discussion below is merely provided for general background information and is not intended to be used as an aid in determining the scope of the claimed subject matter.

The present disclosure relates to an adaptor to couple a prime mover to an actuator. More particularly, the present disclosure relates to an adaptor to convert a battery-powered actuator to a actuator powered by a prime mover other than a battery.

Dump trailers commonly have hydraulic lifts to raise and lower a trailer bed. In many instances, the dump trailer is configured to contain and transport unwanted materials to a dump or other facility.

Typically, the dump trailer is powered by a battery, such as, for example, a twelve volt battery of the type typically utilized to start an automobile. Due to the power required to raise a bed loaded with material, a typical twelve volt battery is able to raise a loaded bed and lower the bed about two times before needing to be recharged. However, there is typically enough time for an operator of the dump trailer to transport more than two trailer loads in a work period, given an operational trailer. Charging the battery can take several hours, which impedes the productivity of the operator. The discharged battery can be replaced with a charged battery, allowing the trailer to continue operations, but replacement batteries are expensive and replacing a discharged battery with a charged battery can be time-consuming. Therefore, the battery is often a limiting factor in the number of loads that a dump trailer can move in a day.

It is common for boat docks to be equipped with boat lifts, which raise a boat out of the water when not in use. Leaving a boat in the water when at dock leads to corrosion and wear caused by water, algae, and other natural elements. In the water, the boat is also subject to being knocked against the dock, potentially damaging the boat or mooring structures. Boat lifts use a winch to raise the boat out of the water. The winch is typically manually or electrically powered. However, the use of manual power is labor-intensive, and the use of electrical power is not ideal near the water.

SUMMARY

This Summary herein is provided to introduce a selection of concepts in a simplified form that are further described below in the Detailed Description. This Summary is not intended to identify key features or essential features of the claimed subject matter, nor are they intended to be used as an aid in determining the scope of the claimed subject matter. The claimed subject matter is not limited to implementations that solve any or all disadvantages noted in the Background.

The present disclosure relates to an adaptor configured to connect a prime mover to an actuator, such as a hydraulic lift for a dump trailer. The hydraulic lift includes a hydraulically powered actuator or hoist that is hydraulically coupled to a pump with hydraulic hoses or lines. The prime mover can be an engine designed to use propane as the fuel is coupled to the pump with the adaptor, where the engine can be configured to accept a conventional pressurized propane canister. The adaptor includes a first portion that is configured to be attached to an actuating end of the engine. The first portion includes an outer surface and an interior through bore. The adaptor includes a second portion that is configured to be attached to the housing of the pump. The second portion includes a central cavity that provides access to a drive shaft of the hydraulic pump. The central cavity is configured to accept the outer surface of the first portion such that the first portion is nested and retained within the central cavity of the second portion. The second portion includes at least one bore that intersects the central cavity and allows a securing mechanism to pass thereon and frictionally engage the outer surface of the first portion, thereby securing the first and second portions together and preventing the rotation of the first portion within the second portion. The outer surface of the first portion and the central cavity of the second portion may include mating flat surfaces that interact to prevent rotation of the first portion relative to the second portion.

A bearing is positioned about the shaft proximate a pump drive engaging end such that the outer portion of the bearing is configured to engage a cavity in the pump housing. The pump drive engaging end is configured to engage a drive shaft of the pump. A centrifugal clutch on the prime mover is configured to engage the distal end of the shaft as the prime mover, such an engine, speed increases, thereby forcing the pump drive engaging end into contact with the drive shaft on the pump. When the clutch engages the shaft due to the rotational speed of the engine, the engine transfers power to the pump through the shaft and causes pressurized hydraulic fluid to be transferred to the actuator such that the bed is raised. Reducing the engine speed or stopping the engine causes the clutch to disengage the shaft, thereby allowing the bed to lower against the resistance of the hydraulic pump.

The adaptor may also be used to couple the prime mover to a gear box. A first portion of the adaptor is configured to be attached to the actuating end of the prime mover. A second portion of the adaptor is configured to be coupled to the gear box, and includes an input shaft that drives gears within the gear box. The first and second portions of the adaptor are coupled as described above where a distal end of a drive shaft is configured to engage the input shaft of the gear box. A clutch on the prime mover forces the drive shaft to engage the input shaft, which in turn causes an output shaft to rotate wherein the output shaft is engaged with an actuator, such as, for example, a winch.

This Summary is not intended to describe each disclosed embodiment or every implementation of the present invention. Many other novel advantages, features, and relationships will become apparent as this description proceeds. The figures and the description that follows more particularly exemplify illustrative embodiments.

DETAILED DESCRIPTION

Figure 1:
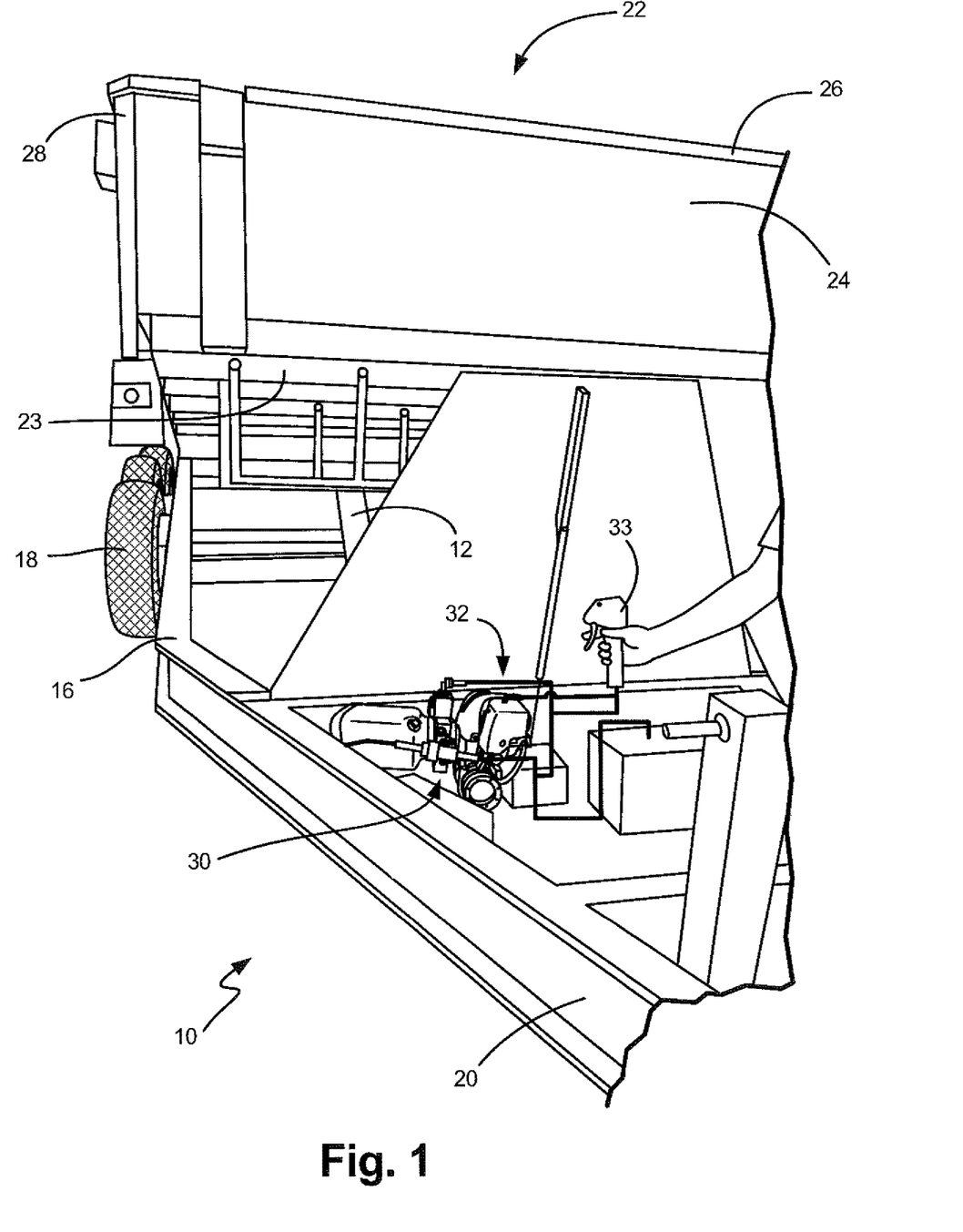
FIG. 1 is a perspective view of a dump trailer with a hydraulic hoist powered by an engine.

A dump trailer 10 with a hydraulic hoist 12 is generally illustrated in FIG. 1. The dump trailer 10 includes a frame 16 that is supported by wheels 18 and has a hitch 20 at a front end for attaching to a prime mover (not shown). A dump box 22 has a floor 23 and a front wall 24, left and right side walls 26 and 28 that extend upwardly from the edges of the floor 23. The dump box 22 has a tail gate at a back end of the floor 23 where the tail gate is positionable from a closed, substantially vertical position where the tail gate retains material in the dump box 22 to an open position wherein as the hoist 12 lifts the dump box 22, the incline on the floor 23 increases and causes the material within the dump box 22 to slide out through the back end. When power to the hydraulic hoist 12 is removed, the weight of the dump box 22 causes the dump box 22 to lower and rest upon the frame 16.

Power is supplied to the hydraulic hoist 12 by a hydraulic pump 30 that is coupled to an engine 32, which is typically configured to utilize propane as a fuel, but may be configured to use other fuels, such as for example, natural gas, gasoline, diesel fuel, or biofuel. A throttling mechanism 33 may be mechanically coupled to the engine 32 to manipulate the rotational speed of the engine 32 and therefore, the power provided to the hydraulic pump 30. The throttling mechanism 33 may be used to adjust the speed at which the hydraulic hoist 12 raises and lowers the dump box 22. While an engine is described and illustrated, any prime mover is within the scope of the present disclosure, including, but not limited to, fossil fuel powered engines, pneumatic motors, hydraulic motors and electric motors.

Figure 2:
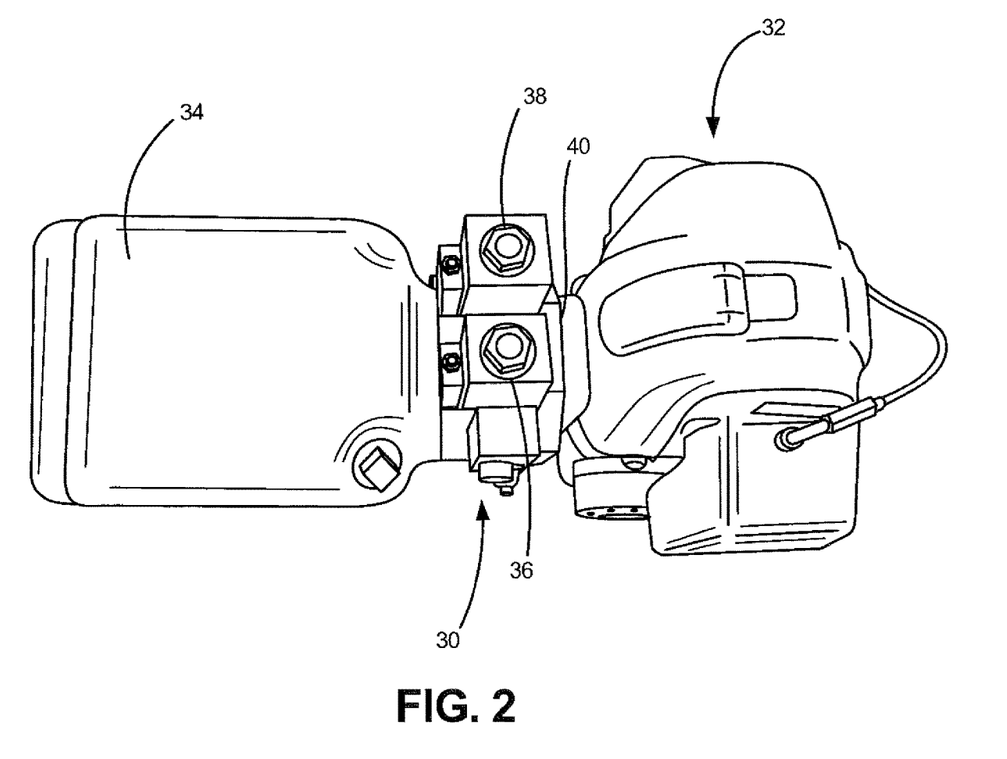
FIG. 2 is a top perspective view of a hydraulic pump coupled to the engine with an adaptor.
Figure 3:
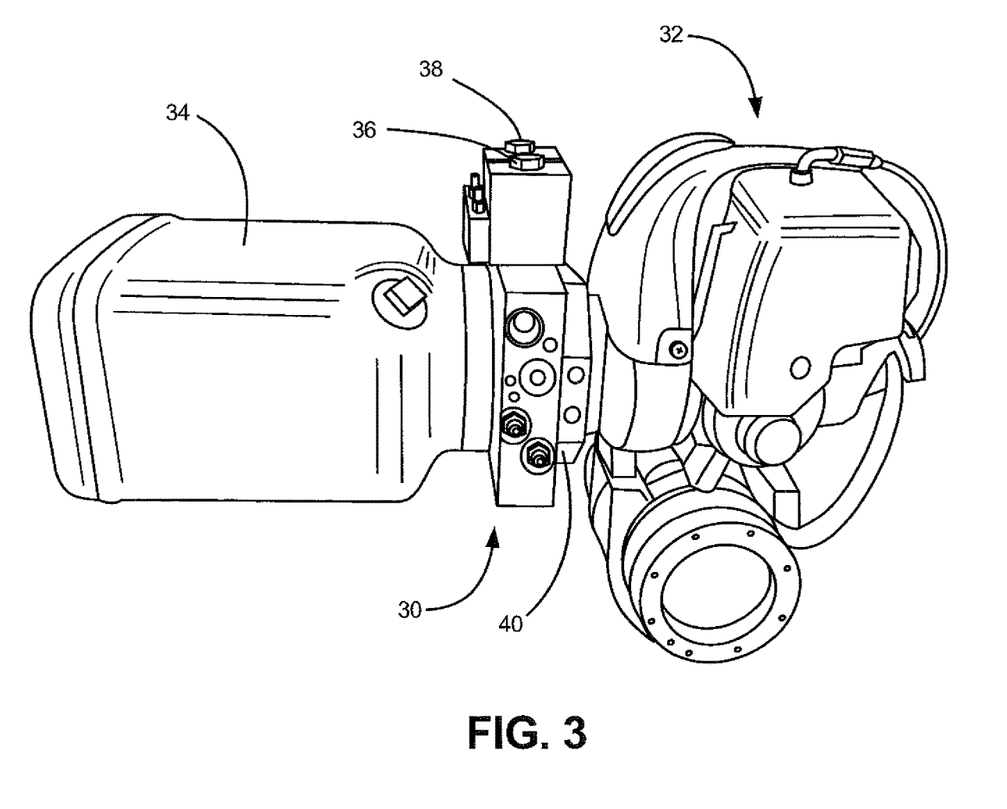
FIG. 3 is a side perspective view of the hydraulic pump coupled to the engine with the adaptor.
Figure 4:
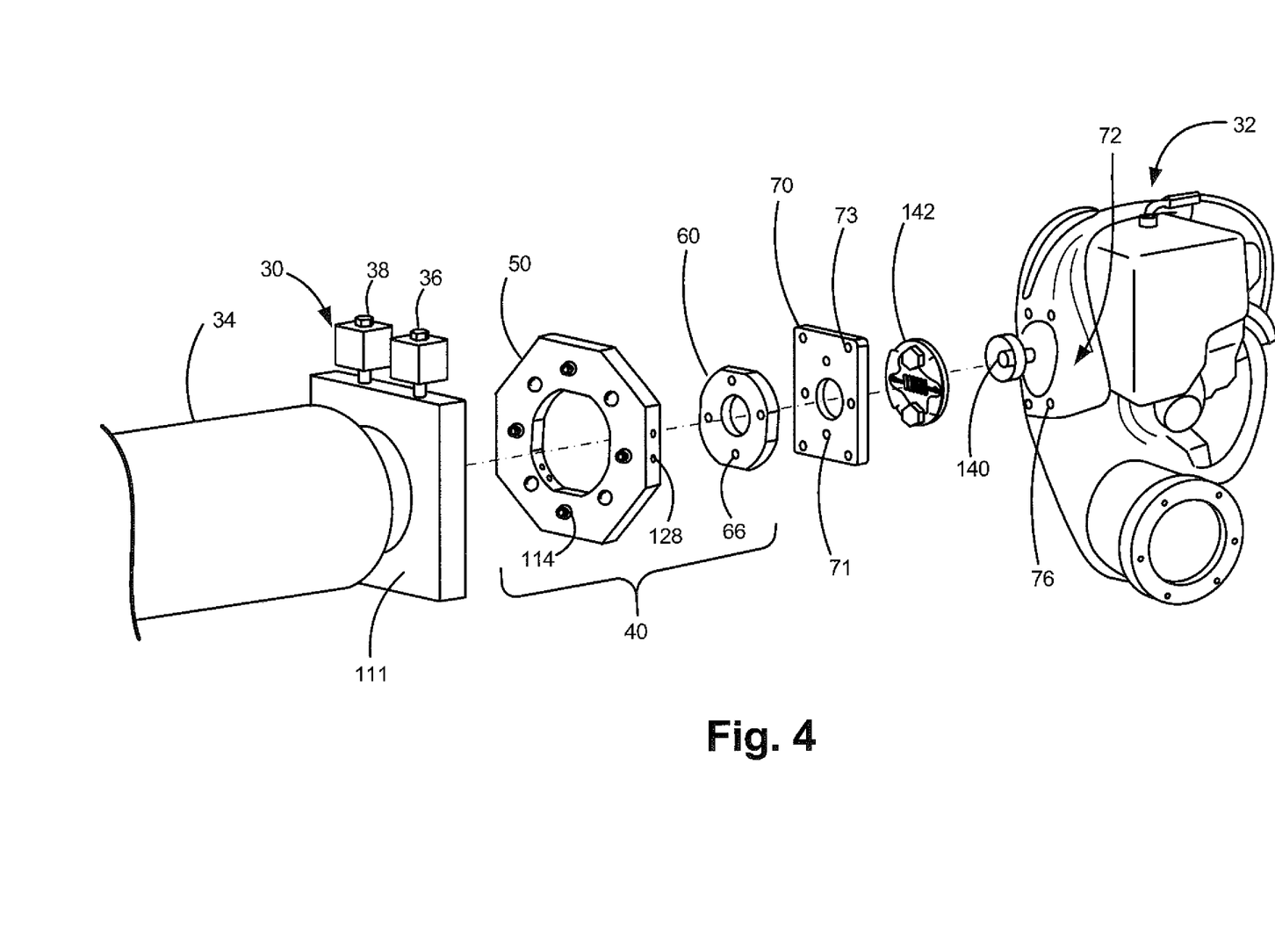
FIG. 4 is an exploded view of the hydraulic pump, the engine, and the adaptor for coupling the pump and engine together.

Referring to FIGS. 2-4, the hydraulic pump 30 is coupled to the engine 32 with an adaptor 40. A reservoir 34 is coupled to the hydraulic pump 30 to manage the amount of hydraulic fluid in the system. The hydraulic pump 30 includes a high pressure discharge port 36 and a low pressure inlet port 38 that are in fluid communication with the hoist 12 through hoses (not shown) such that the hydraulic pump 30 can be utilized to raise and lower the dump box 22 with the hoist 12.

The length of the reservoir 34, hydraulic pump 30, and a typical twelve volt battery is about 18 inches. When coupled together, the hydraulic pump 30, reservoir 34, and a typical propane-powered engine 32 with the adaptor 40 is about twenty three inches in length. Due to the compact nature of adaptor 40 and engine 32, little or no modification to the dump trailer 10 is likely required to convert the drive mechanism from an electric motor to a engine powered by propane.

As illustrated in FIG. 4, an engine attaching portion 60 of the adaptor 40 is secured to a mounting plate 70, which is mounted to the engine block 72 as described below. Pump attaching portion 50 of the adaptor 40 is attached to pump housing 111. The engine attaching portion 60 fits into the pump attaching portion 50, and is secured by threaded fasteners 136 as described below. When joined, the engine attaching portion 60 nests within the pump attaching portion 50 so that the engine 32 can transfer power to the hydraulic pump 30.

Figure 4A:
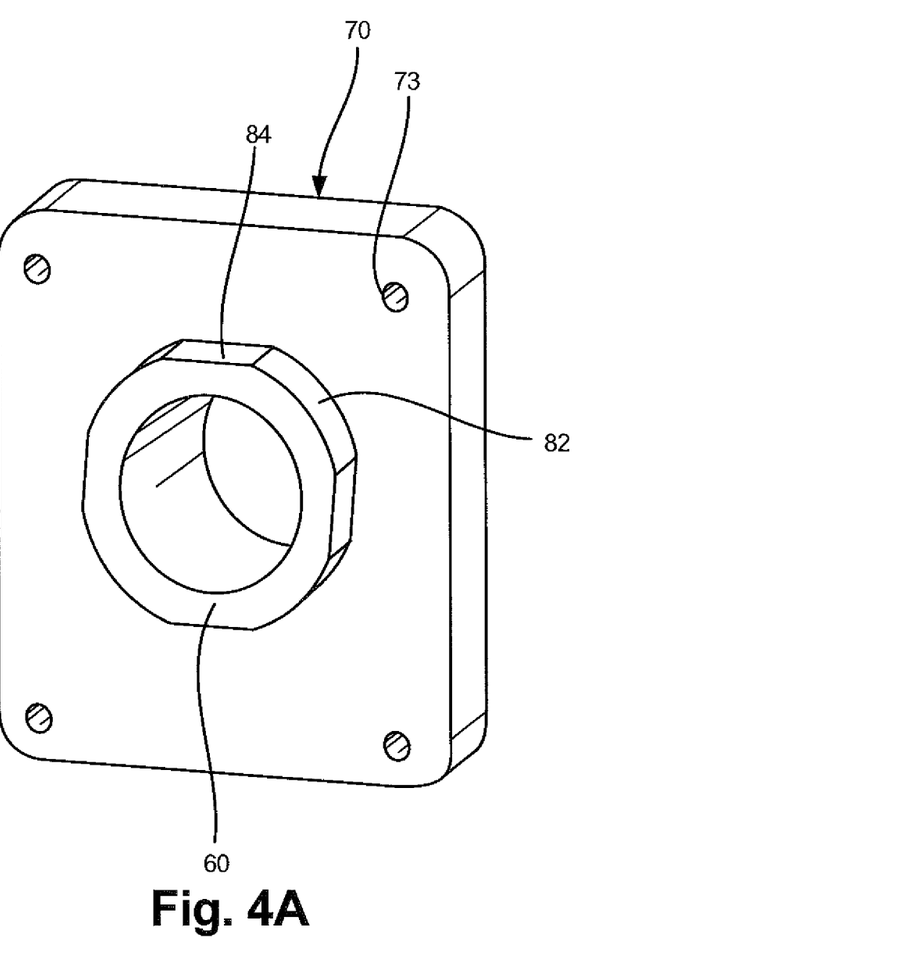
FIG. 4A is a perspective view of another embodiment of a portion of the adapter that attaches to the prime mover.

Referring to FIG. 4A, another embodiment of the engine attaching portion is illustrated where the engine attaching portion 60 and the mounting plate 70 are of a monolithic construction. The monolithic embodiment includes the through bores 73 for attaching to the adapter portion to the engine and a through bore 59 configured to carry the clutch. Another name for the engine attaching portion of the adapter is a clutch drum carrier. The embodiment of the clutch drum carrier illustrated in FIG. 4A is interchangeable with the multi-component clutch drum carrier illustrated in FIGS. 4 and 5.

Figure 6A:
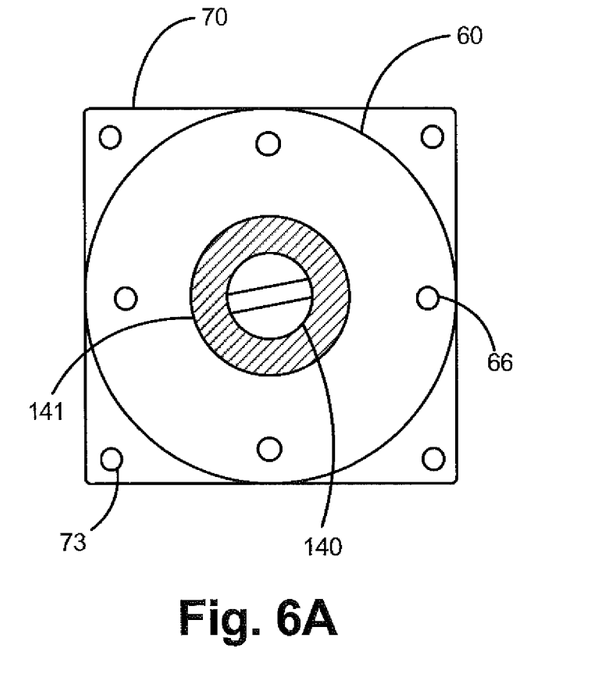
FIG. 6A is a view of an engine attaching portion of the adaptor attached to a mount plate.
Figure 6B:
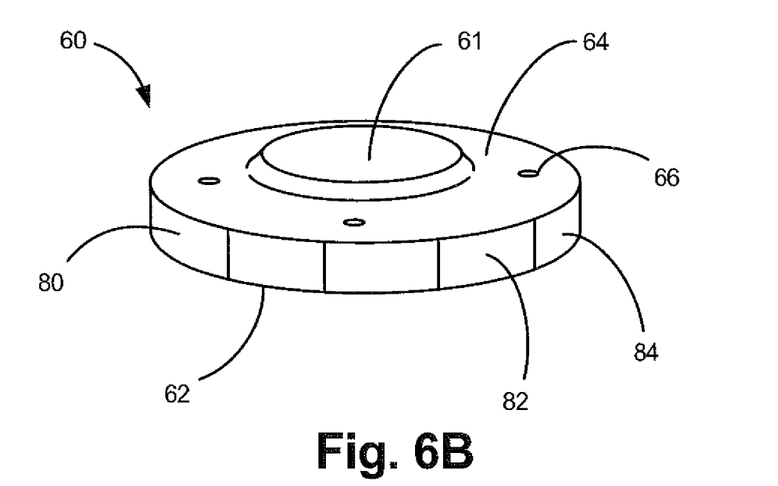
FIG. 6B is a perspective view of the engine attaching portion of the adaptor.

As shown in FIGS. 6A and 6B, engine attaching portion 60 includes a plurality of threaded bores 66 that are aligned with bores 71 in the mounting plate 70. A plurality of threaded bolts are positioned through bores 71 to threadably engage threaded bores 66, thereby securing the engine engaging portion 60 to mounting plate 70. Mounting plate 70 is then secured to an engine block 72 with a plurality of threaded bolts 74 that are positioned through bores 73 in mounting plate 70 to threadably engage threaded bores 76 in the engine block 72. However, other securing mechanisms besides threaded bolts are also contemplated including, but not limited to, a weld and an adhesive.

Engine attaching portion 60 includes a continuous outer surface 80 that has substantially arcuate portions 82 with a constant radius that are connected by substantially flat portions 84. The engine attaching portion 60 includes an interior bore 61 configured to allow a drive shaft 140 and a bearing 141 that carries the shaft 140 to pass therethrough, as described below.

Figure 7A:
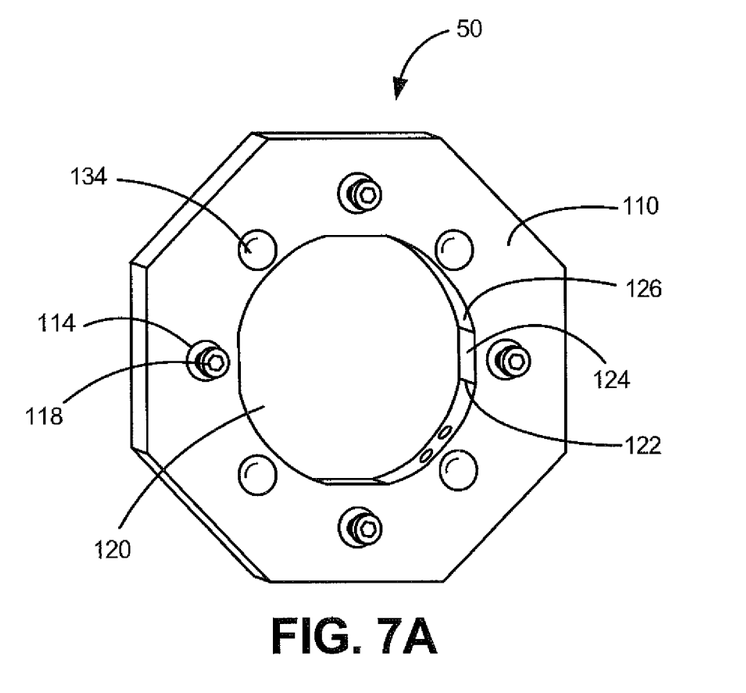
FIG. 7A is a front view of an actuator attaching portion of the adaptor.
Figure 7B:
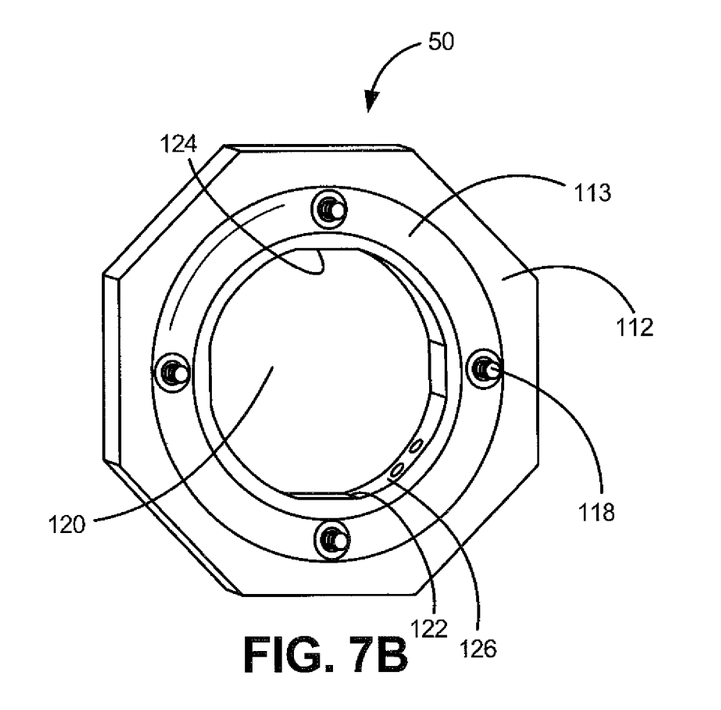
FIG. 7B is back view of the actuator attaching portion of the adaptor.

Referring to FIGS. 7A and 7B, the pump attaching portion 50 has a plurality of apertures 114 that pass from a front surface 110 to a back surface 112, and are aligned with threaded bores in a pump housing 111 (FIG. 4). Threaded bolts 118 are inserted into the apertures 114 and threadably engage the threaded bores such that the back surface 112 abuts a surface of the pump housing 111. The apertures 114 are typically countersunk, and the bolts 118 have heads that are also countersunk so as to not interrupt the front surface 110.

Referring to FIG. 7B, the back surface 112 includes a shoulder 113 that conforms the back surface 112 to the configuration of the surface of the pump housing 111.

However, surface 112 can have any shape, provided the back surface 112 is secured to the pump housing 111.

The pump attaching portion 50 includes a through bore 120 that passes from the front surface 110 to the back surface 112 and provides access to a pump drive shaft that drives the pump impeller. Surface 122 of bore 120 complements outer surface 80 of engine attaching portion 60, and includes arcuate portions 124 and substantially flat portions 126. The engine attaching portion 60 may be positioned within the bore 120 of the pump attaching portion 50 such that the arcuate portions 82 and 124 and the substantially flat portions 84 and 126 of the engine attaching portion 60 and the pump attaching portion 50 interact. The engagement of the flat portions 84 and 126 prevent rotation of the engine attaching portion 60 relative to the pump attaching portion 50. Any number and configuration of flat and arcuate portions may be used, so long as the flats of the respective portions 50, 60 engage to prevent relative rotation of the portions 50, 60 of adaptor 40. Further, polygonal configurations, elliptical configurations, mating protuberances and slots for the surfaces can be within the scope of the present disclosure. Also, it is contemplated that the pump attaching the portion 50 nests with the engine attaching portion 60.

Figure 7C:
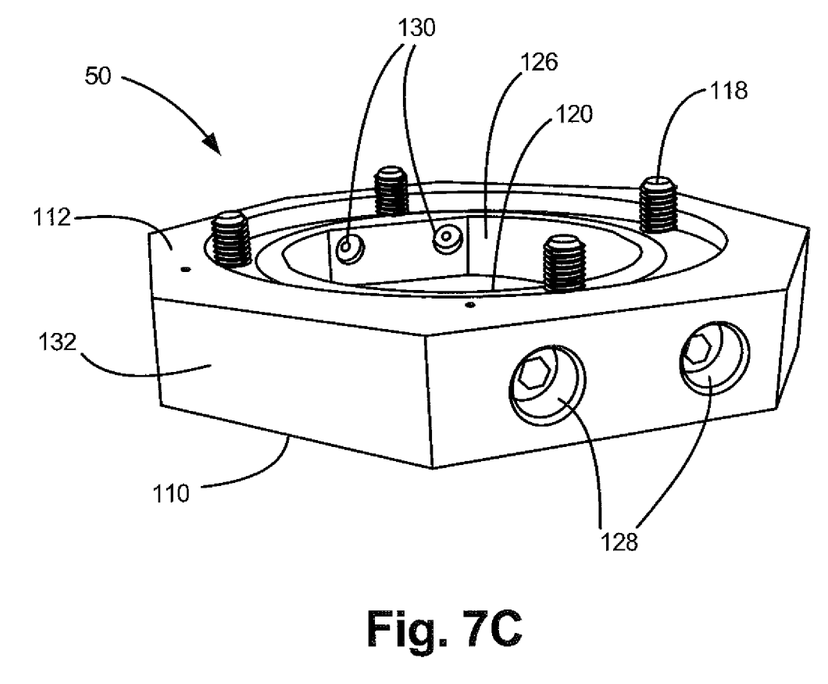
FIG. 7C is a perspective view of the actuator attaching portion of the adaptor.
Figure 8:
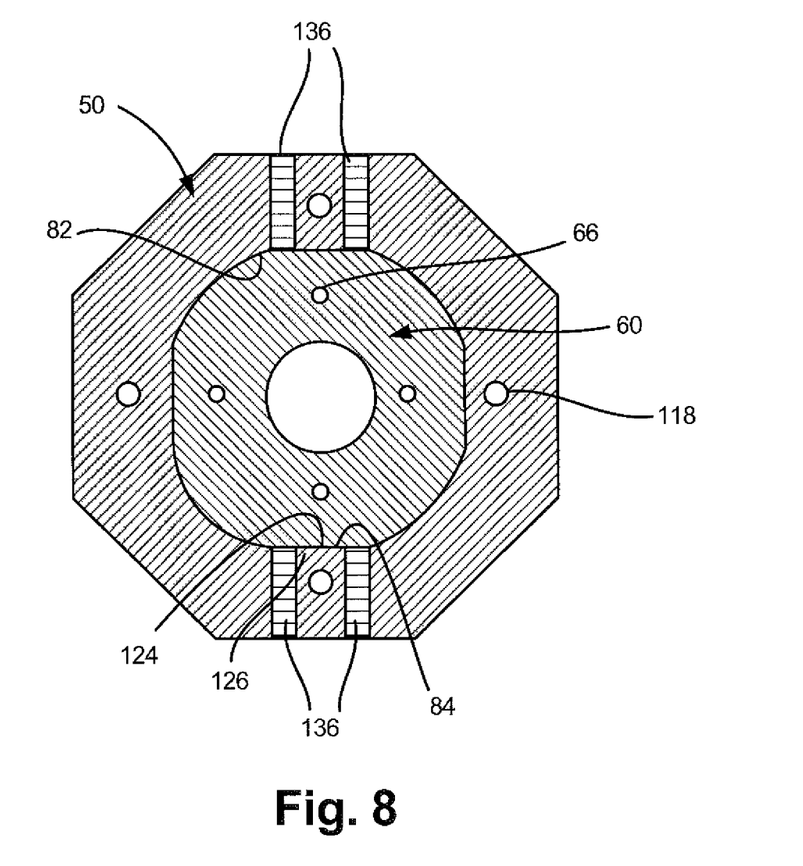
FIG. 8 is a sectional view of the adaptor and an actuator.

Referring to FIGS. 7C and 8, an exemplary embodiment of the pump attaching portion 50 includes a first pair of threaded bores 128 and a second set of threaded bores 130, all of which pass from an outer surface 132 to the surface defining the through bore 120 and intersect the flat portions 126. Threaded fasteners 136, such as set screws, are inserted into bores 128 and 130 to frictionally engage the flat portions 84 of the outer surface 80 of the engine attaching portion 60, thereby preventing rotation and securing the engine attaching portion 60 to the pump attaching portion 50. Two pairs of fasteners 136 are described, but any number useful in securing portions 50 and 60 may be used. When threaded fasteners 136 are utilized, the mating surfaces can be circular in configuration.

Referring to FIG. 7A, the front surface 110 of the pump attaching portion 50 includes cavities 134 that are configured to accept the heads of the bolts 74 to allow the front surface 64 of the engine engaging portion 60 to abut the front surface 110 of the pump engaging portion 50. Having the surfaces of the engine attaching portion 60 abut and nest within the pump attaching portion 50 allows for a compact design.

As the speed of the engine 32 is increased, for example with throttling mechanism 34, the clutch engages the shaft 140 and forces shaft 140 to engage a drive shaft of the pump 30 causing pressurized fluid to be transferred to the actuator, thereby causing the actuator 12 to expand and raise the dump box 22. To disengage the actuator 12 and, for example, lower dump box 22, the engine speed is reduced or stopped such that shaft 140 disengages the drive shaft of the pump 30. With the engine 32 throttled down or off, the actuator 12 is contracted due to the weight of the trailer bed.

Figure 5:
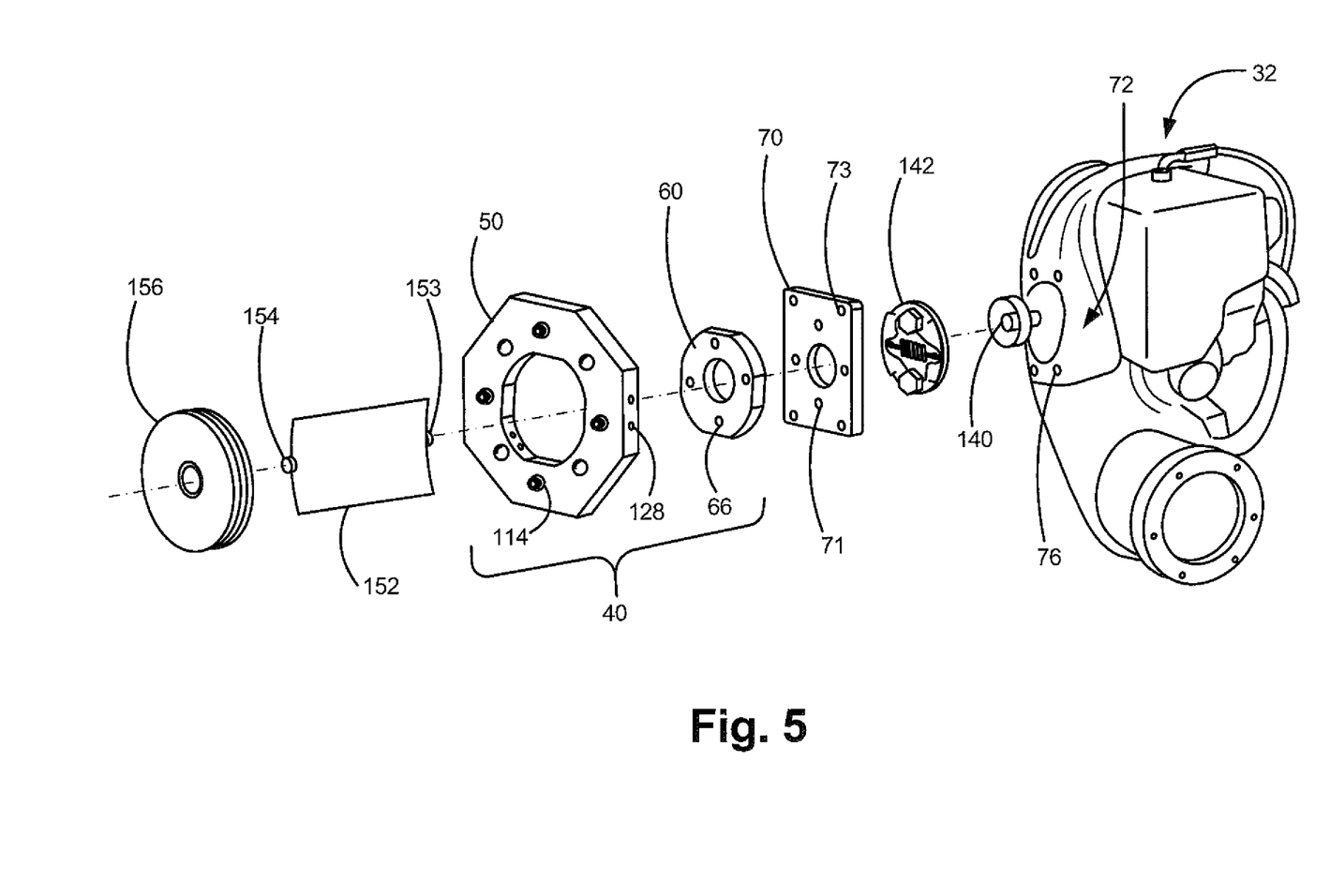
FIG. 5 is an exploded view of a winch, a gear box, a engine, and an adaptor for coupling the pump and engine together.

Referring to FIG. 5, in an alternative embodiment, adaptor 40 may be used to couple a prime mover, such as an engine, to a gear box 152 of an actuator, such as a winch 156. Gears in gear box 152 convert the rotational speed and torque output by the engine 32 to at least one speed and torque suitable for the desired application. For example, winch 156 may be mounted to a boat lift used to raise a boat out of the water at dock. As can be seen in FIG. 5, engine attaching portion 60 may be mounted to an internal combustion engine 32. An engine attaching portion 60 includes bore 61 configured to accept a drive shaft 140 that engages the clutch 142 of engine 32. A gear box attaching portion 50 may be secured to a gear box 152, and includes a bore 120 configured to accept engine attaching portion 60, and to allow the drive shaft 140 access to gears disposed in gear box 152. Engine attaching portion 60 fits into bore 120 of gear box attaching portion 50, and may be secured by fasteners 136. The gears of gear box 152 may be coupled to drive shaft 140 of engine 32 at input 153, and to the winch 156 at output 154. The engine 32 causes drive shaft 140 to rotate, thereby engaging the gears and turning the winch 156. The gear box 152 can be configured to reduce the rotational speed of the gear box output to better control the speed at which the winch 156 operates. Depending upon the application, the gear box 152 can also increase the rotational rate of the gear box output. The winch 156 draws up or releases cables attached to a cradle configured to support a boat.

A winch and a hydraulic hoist are described herein, but adaptor 40 may be used to couple an engine 32 to any actuator, either directly or through an intermediate device that, for example, controls speed or torque or performs power conversion, such as a gear train or a hydraulic or pneumatic pump. Adaptor 40 may be used to convert an actuator or intermediate device designed for use with an electric or other power source to be used with an internal combustion engine, such as for example, a propane powered engine.

Although the subject matter has been described in a language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims. In addition, any feature disclosed with respect to one embodiment may be incorporated in another embodiment, and vice-versa.

What is claimed is:

1. An adaptor for connecting an internal combustion engine powered prime mover to an actuator assembly, wherein the adaptor comprises:
   a first member configured to attach to the internal combustion engine prime mover, the first member having a non-circular outer surface and an interior through bore configured to pass a drive shaft therethrough; and
   a second member configured to attach to the actuator assembly, the second member having a through bore with a non-circular inner surface, wherein the non-circular inner surface is configured to accept the non-circular outer surface of the first member, and wherein the non-circular surfaces are configured to prevent rotation of the first member within the second member, wherein the second member includes at least one bore that intersects the central cavity and allows a securing mechanism to pass therethrough and frictionally engage the outer surface of the first portion, thereby securing the first and second portions together.

2. The adaptor of claim 1 wherein the actuator assembly comprises:
   a hydraulic actuator; and
   a hydraulic pump configured to drive the hydraulic actuator,
   wherein the adaptor is configured to connect the prime mover to the hydraulic pump such that the prime mover is configured to power the pump to drive the actuator.

3. The adaptor of claim 1 wherein the actuator assembly comprises:
   an actuator; and
   a gear box configured to convert at least one speed value and at least one torque value output by the prime mover to at least one speed value and at least one torque value input to the actuator,
   wherein the adaptor is configured to connect the prime mover to the gear box such that the prime mover is configured to drive the actuator at the at least one input speed and the at least one input torque.

4. The adaptor of claim 3 wherein the actuator is a winch.

5. The adaptor of claim 1 wherein the internal combustion engine is configured to be fueled by propane.

6. The adaptor of claim 1, and further comprising:
   a mounting plate having at least one mounting bore configured to accept at least one mounting bolt to secure the mounting plate to the prime mover, and having at least one adaptor bore configured to accept at least one adaptor bolt to secure the first member to the mounting plate, and
   wherein the second member has at least one cavity configured to accept the at least one mounting bolt such that the first member and the second member abut.

7. The adaptor of claim 1 wherein the prime mover further comprises a centrifugal clutch, and a drive shaft wherein the drive shaft is configured to be coupled to the actuator assembly, and wherein the centrifugal clutch is configured to engage the drive shaft to drive the actuator assembly.

8. An actuating system comprising:
   a hydraulic actuator;
   a hydraulic pump comprising a pump drive shaft and configured to drive the actuator;
   a prime mover comprising an internal combustion engine powering a drive shaft; and
   an adaptor for connecting the prime mover to the pump, the adaptor comprising:
      a first member configured to attach to the prime mover, the first member having an non-circular outer surface and an interior through bore configured to pass the drive shaft therethrough; and
      a second member configured to attach to the hydraulic pump, the second member having a through bore with a non-circular inner surface, wherein the non-circular inner surface is configured to accept the non-circular outer surface of the first member, and wherein the non-circular surfaces are configured to prevent rotation of the first member within the second member,
   wherein the adaptor is configured to connect the prime mover to the hydraulic pump such that the prime mover is configured to power the pump to drive the hydraulic actuator.

9. The actuating system of claim 8 wherein the through bore of the second member is configured to provide access to the pump drive shaft such that the drive shaft can engage the pump drive shaft.

10. The actuating system of claim 8 wherein the hydraulic actuator is configured to be connected to a dump box of a dump trailer.

11. The actuating system of claim 8, and further comprising:
   a mounting plate having at least one mounting bore configured to accept at least one mounting bolt to secure the mounting plate to the prime mover, and having at least one adaptor bore configured to accept at least one adaptor bolt to secure the first member to the mounting plate, and
   wherein the second member has at least one cavity configured to accept the at least one mounting bolt such that the first member and the second member abut.

12. The actuating system of claim 8 wherein the prime mover further comprises a centrifugal clutch, wherein the drive shaft is configured to be coupled to the hydraulic pump, and wherein the centrifugal clutch is configured to engage the drive shaft to drive the hydraulic pump to power the actuator.

13. A actuating system comprising:
   a prime mover comprising an internal combustion engine;
   an actuator;
   a gear box coupled to the actuator, the gear box configured to provide at least one speed and torque conversion between the prime mover and the actuator; and
   an adaptor for connecting the prime mover to the gear box, the adaptor comprising:
      a first member configured to attach to the prime mover, the first member having an non-circular outer surface and an interior through bore configured to pass a drive shaft therethrough; and
      a second member configured to attach to the gear box, the second member having a through bore with a non-circular inner surface, wherein the non-circular inner surface is configured to accept the non-circular outer surface of the first member, and wherein the non-circular surfaces are configured to prevent rotation of the first member within the second member; and
   wherein the adaptor is configured to connect the prime mover to the gear box such that the prime mover is configured to drive a winch.

14. The actuating system of claim 13, and further comprising:
   a mounting plate having at least one mounting bore configured to accept at least one mounting bolt to secure the mounting plate to the prime mover, and having at least one adaptor bore configured to accept at least one adaptor bolt to secure the first member to the mounting plate, and
   wherein the second member has at least one cavity configured to accept the at least one mounting bolt such that the first member and the second member abut.

15. The actuating system of claim 13 wherein the prime mover further comprises a centrifugal clutch and a drive shaft, wherein the drive shaft is configured to be coupled to the gear box, and wherein the centrifugal clutch is configured to engage the drive shaft to drive the gear box to power the actuation.

* * * * *